(12) United States Patent
Wilson et al.

(10) Patent No.: US 9,806,369 B2
(45) Date of Patent: Oct. 31, 2017

(54) FUEL CELL STACK ASSEMBLY

(71) Applicant: Intelligent Energy Limited, Loughborough (GB)

(72) Inventors: Antony Richard Wilson, Leicestershire (GB); Nimeshkumar Tailor, Leicestershire (GB)

(73) Assignee: Intelligent Energy Limited, Loughborough (GB)

( * ) Notice: Subject to any disclaimer, the term of this patent is extended or adjusted under 35 U.S.C. 154(b) by 71 days.

(21) Appl. No.: 14/427,961

(22) PCT Filed: Sep. 12, 2013

(86) PCT No.: PCT/GB2013/052389
§ 371 (c)(1),
(2) Date: Mar. 12, 2015

(87) PCT Pub. No.: WO2014/045014
PCT Pub. Date: Mar. 27, 2014

(65) Prior Publication Data
US 2015/0221970 A1    Aug. 6, 2015

(30) Foreign Application Priority Data

Sep. 18, 2012 (GB) .................................. 1216648.4

(51) Int. Cl.
*H01M 8/248* (2016.01)
*H01M 8/247* (2016.01)

(52) U.S. Cl.
CPC ........... *H01M 8/247* (2013.01); *H01M 8/248* (2013.01)

(58) Field of Classification Search
None
See application file for complete search history.

(56) References Cited

U.S. PATENT DOCUMENTS 6,669,826 B1    12/2003  Milgate, Jr. et al.
2002/0142204 A1  10/2002  Prediger et al.
(Continued)

FOREIGN PATENT DOCUMENTS

FR    2865853    8/2005
JP    H02144857  6/1990
(Continued)

OTHER PUBLICATIONS

English translation of JP2008047330 (2008).*
(Continued)

*Primary Examiner* — Yoshitoshi Takeuchi
(74) *Attorney, Agent, or Firm* — Baker & Hostetler LLP

(57) ABSTRACT

The invention relates to a fuel cell stack assembly (100) and an associated method of assembling the fuel cell stack. The fuel cell stack assembly (100) comprises a plurality of fuel cell assemblies (102) adjacent to one another, a first end plate (104) at a first end (106) of the plurality of fuel cell assemblies, a second end plate (108) at a second opposing end (110) of the plurality of fuel cell assemblies and a tie rod (112) configured to engage the first and second end plates (104, 108) and thereby apply a compression force to the plurality of fuel cell assemblies (102). The tie rod (112) is a unitary component that comprises a first engagement surface (114) that engages with the first end plate (104) and a second engagement surface (116) that engages with the second end plate (108).

13 Claims, 3 Drawing Sheets

(56) References Cited

U.S. PATENT DOCUMENTS

| | | |
|---|---|---|
| 2006/0093890 A1 | 5/2006 | Steinbroner |
| 2006/0142039 A1 | 6/2006 | Debe et al. |
| 2007/0281190 A1 | 12/2007 | Shelter et al. |
| 2010/0167156 A1 | 7/2010 | Lake et al. |

FOREIGN PATENT DOCUMENTS

| | | | |
|---|---|---|---|
| JP | H09270267 | 10/1997 | |
| JP | 2005-310784 A | 11/2005 | |
| JP | 2008-047330 | 2/2008 | |
| JP | 2008047330 * | 2/2008 | ............ H01M 8/24 |
| JP | 2008-077936 | 4/2008 | |
| JP | 2008-525986 A | 7/2008 | |
| WO | WO 02/19456 A1 | 3/2002 | |

OTHER PUBLICATIONS

Great Britain Patent Application No. 1216648.4; Search Report; dated Oct. 31, 2012; 1 page.
International Search Report dated Jan. 20, 2014, issued in International patent application PCT/GB/2013/052389.

* cited by examiner

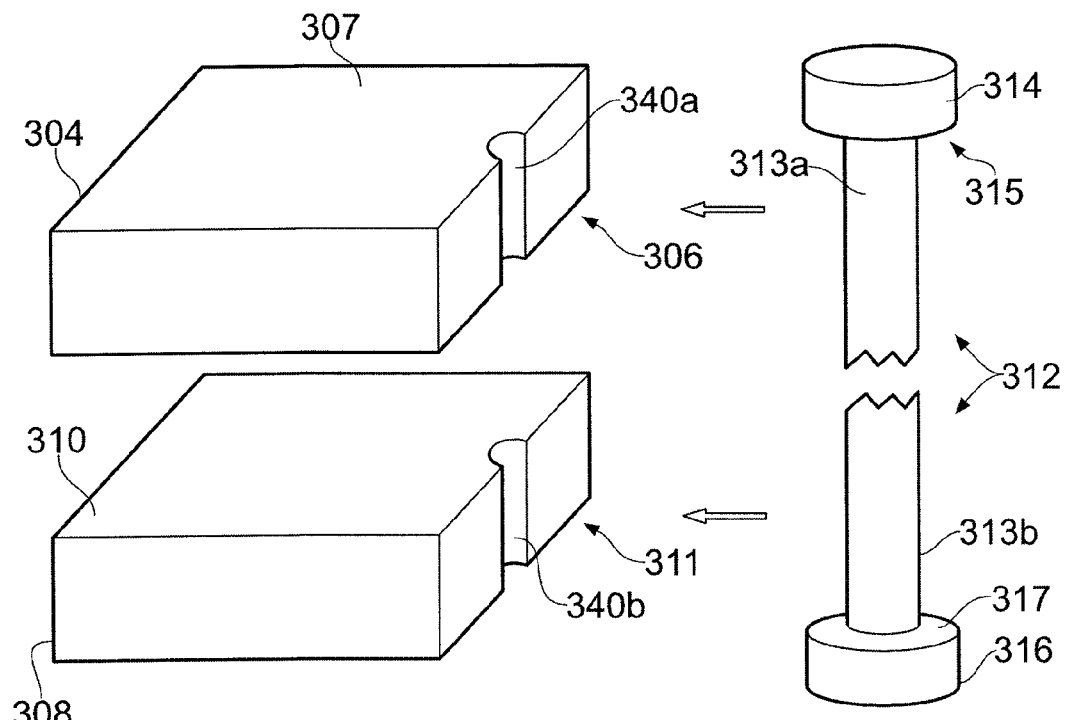
FIG. 3
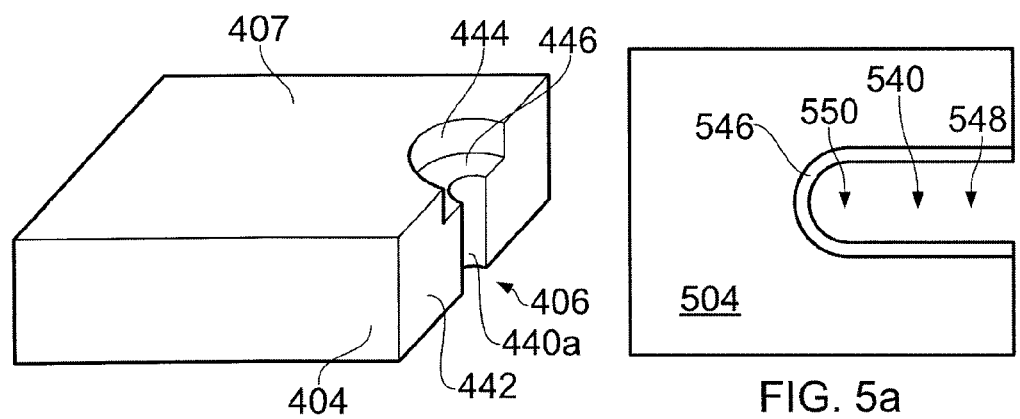
FIG. 4
FIG. 5a
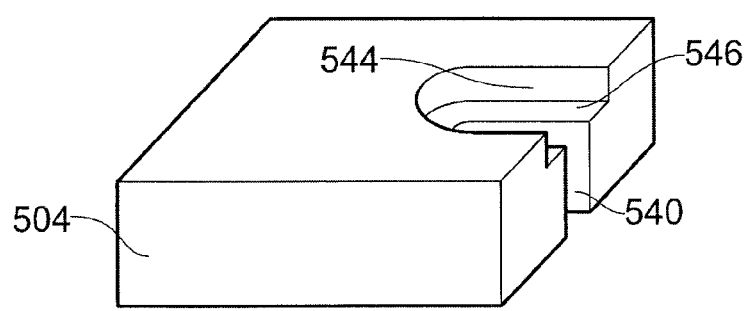
FIG. 5b

FUEL CELL STACK ASSEMBLY

CROSS-REFERENCE TO RELATED APPLICATIONS

This patent application is a Continuation of International patent application PCT/GB2013/052389 filed Sep. 12, 2013, which claims priority to Great Britain patent application GB1216648.4 filed Sep. 18, 2012, the disclosures of which are incorporated by reference in their entirety.

The invention relates to fuel cell stack assemblies and in particular, a fuel cell stack assembly comprising a unitary tie rod and an associated method of assembling the fuel cell stack.

Conventional electrochemical fuel cells convert fuel and oxidant into electrical energy and a reaction product. A typical layout of a conventional fuel cell assembly 10 is shown in FIG. 1a which, for clarity, illustrates the various layers in exploded form. A solid polymer ion, transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to as the membrane-electrode assembly, or MEA.

The polymer membrane and porous electrode layers are sandwiched between an anode fluid flow field plate 14 and a cathode fluid flow field plate 15. Intermediate backing layers 12a and 13a may also be employed between the anode fluid flow field plate 14 and the anode 12 and similarly between the cathode fluid flow field plate 15 and the cathode 13. The backing layers are of a porous nature and fabricated so as to ensure effective diffusion of gas to and from the anode and cathode surfaces as well as assisting in the management of water vapour and liquid water.

The fluid flow field plates 14, 15 are formed from an electrically conductive, non-porous material by which electrical contact can be made to the respective anode electrode 12 or cathode electrode 13. At the same time, the fluid flow field plates facilitate the delivery and/or exhaust of fluid fuel, oxidant and/or reaction product to or from the porous electrodes 12, 13. This is conventionally effected by forming fluid flow passages in a surface of the fluid flow field plates, such as grooves or channels 16 in the surface presented to the porous electrodes 12, 13.

Typically a number of the fuel cell assemblies 10 illustrated in FIG. 1a are stacked together to form a fuel cell stack. It will be appreciated that the design of the individual fuel cells 10 illustrated in FIG. 1a may be modified so as to be better suited to stacking. For example, anode fluid flow plate 14 and cathode fluid flow plate 15 can be provided by different sides of a single bipolar plate.

A conventional fuel cell stack assembly 20 is illustrated in FIG. 1b. The conventional fuel cell stack assembly comprises a plurality of fuel cells 22, a first end plate 24 and a second end plate 28. A plurality of conventional tie rods 32 and a plurality of sealing bolts 33, 34 are used to compress the fuel cells 22 to a working dimension.

The fuel cell assemblies 22 should be in compression during use so that seals around the fuel cells assemblies 22 can function effectively and prevent the escape of oxidant and fuel. To achieve this compression, the tie rods 32 are provided with threading at their extremities for the engagement of bolts 33, 34. A first bolt 33 can be engaged with a first end of the tie rod 32 that protrudes from the first end plate 24. A second bolt 34 can be engaged with a second end of the tie rod 32 that protrudes from the second end plate 28. By tightening the bolts, the fuel cell assemblies can be compressed.

According to a first aspect of the invention, there is provided a fuel cell stack assembly comprising:
  a plurality of fuel cell assemblies adjacent to one another;
  a first end plate at a first end of the plurality of fuel cell assemblies;
  a second end plate at a second opposing end of the plurality of fuel cell assemblies; and
  a tie rod configured to engage the first and second end plates and thereby apply a compression force to the plurality of fuel cell assemblies,
  wherein the tie rod is a unitary component that comprises a first engagement surface that engages with the first end plate and a second engagement surface that engages with the second end plate.

The provision of a unitary tie rod can allow for a simplified construction of the fuel cell. The unitary tie rod can also allow for a reduction in the cost associated with providing and assembling a tie rod comprising multiple components. The fuel cell stack assembly may be held at a desired level of compression without the need to adjust tie rods because the unitary tie rods are manufactured with a preconfigured length between the first engagement surface and the second engagement surface.

The first engagement surface and the second engagement surface may be transverse to an axial length of the tie rod.

The first and second end plates may be configured to retain the tie rod in position by a force exerted on the first engagement surface and the second engagement surface of the tie rod along an axis of the tie rod. The force may result from the resilient expansion of the constrained plurality of fuel cell assemblies from a compressed state. The plurality of fuel cell assemblies may exert an outward force normal to the plane of the plurality of fuel cell assemblies.

The first end plate may comprise an engagement recess. The engagement recess of the first end plate may be configured to engage with the first engagement surface of the tie rod. The second end plate may comprise an engagement recess. The engagement recess of the second end plate may be configured to engage with the second engagement surface of the tie rod. The provision of engagement recesses can improve retention of the tie rod within the fuel cell assembly and prevent tie rods being removed from the assembly by the application of force in the plane of the fuel cell plates. An outer surface of the first end plate may comprise the engagement recess. An outer surface of the second end plate may comprise the engagement recess.

One or more of the engagement recesses may comprise a retaining member configured to prevent the tie rod from disengaging from the first and second end plates.

The tie rod may comprise a first engagement portion. The tie rod may comprise a second engagement portion. The tie rod may comprise an extending portion between the first engagement portion and the second engagement portion in an axial direction. The first engagement portion may have a greater cross section than the extending portion. The second engagement portion may have a greater cross section than the extending portion. The first engagement surface of the tie rod may be provided on the first engagement portion. The second engagement surface of the tie rod may be provided on the second engagement portion.

The extending portion may be cylindrical, and may or may not have a circular cross section. Alternatively, the extending portion may be prismatic. The extending portion may have a variable cross section along its length. The extending portion may be hollow or solid. The first and/or second engagement portion may be cylindrical or prismatic. The first and/or second engagement portion may have a variable cross section along its length. The first and/or second engagement portion may be hollow or solid.

The first and second engagement portions may be adjacent to opposing ends of the extending portion of the tie rod. The first engagement surface of the tie rod may face the second engagement surface of the tie rod.

A side of the first and/or second end plate may comprise a side recess. A side of each of the plurality of fuel cell assemblies may comprise a side recess. Such side recess may be configured to receive the tie rod and may extend throughout the thickness of the end plate or fuel cell assemblies. Alternatively, the side recess of the first and/or second end plate may terminate within the end plate and not extend throughout the thickness of the end plate.

The side recesses of the first end plate and the second end plate may have a common cross section. The side recesses of the first end plate, second end plate and each of the plurality of fuel cell assemblies may have a common cross section. The common cross section of the side recesses may be larger than or equal to a cross section of the tie rod. The common cross section of the side recesses may be larger than or equal to a cross section of the extending portion of the tie rod.

One or more of the side recesses may comprise a retaining member configured to prevent the tie rod from disengaging from the first and second end plates. The retaining member may be a clip.

According to a further aspect of the invention there is provided a method of assembling a fuel cell stack, the method comprising:
  aligning a plurality of fuel cell assemblies;
  locating a first end plate at a first end of the plurality of fuel cell assemblies;
  locating a second end plate at a second end of the plurality of fuel cell assemblies such that the first end plate, the plurality of fuel cell assemblies and second end plate provide a fuel cell stack;
  compressing the fuel cell stack to a dimension that is smaller than an intended working dimension of the fuel cell stack;
  locating a unitary tie rod such that a first engagement surface of the tie rod is in the vicinity of the first end plate and a second engagement surface of the tie rod is in the vicinity of the second end plate;
  allowing the fuel cell stack to expand to the intended working dimension, at which point the first engagement surface of the tie rod engages with the first end plate and the second engagement surface of the tie rod engages with the second end plate thereby impeding further expansion of the fuel cell stack beyond the intended working dimension.

Locating the tie rod may comprise inserting an extending portion of the tie rod in to a side recess in a side of the fuel cell stack.

Locating the tie rod may comprise positioning the tie rod such that the first engagement surface is laterally coincident with an engagement recess in the first end plate. Locating the tie rod may comprise positioning the tie rod such that the second engagement surface is laterally coincident with an engagement recess in the second end plate. An engagement surface being laterally coincident with an engagement recess may mean that the engagement surface is positioned over the engagement recess.

Allowing the fuel cell stack to expand to the intended working dimension may comprise engaging the first engagement surface of the tie rod in the engagement recess of the first end plate. Allowing the first end plate, the plurality of fuel cell assemblies and second end plate to expand to the intended working dimension may comprise engaging the second engagement surface of the tie rod in the engagement recess of the second end plate.

The invention will now be described with reference to the following drawings by way of example only, in which:

FIG. 3 illustrates interaction between a tie rod, a first end plate and a second end plate in accordance with the present invention;

FIG. 4 shows a schematic of a portion of an end plate for use with an embodiment of the invention;

FIG. 5a shows a schematic of a top view of a portion of an end plate for use with an embodiment of the invention;

FIG. 5b shows a schematic of a perspective view of a portion of an end plate for use with an embodiment of the invention;

One or more embodiments of the invention relate to a fuel cell stack comprising a unitary tie rod, as opposed to a tie rod that is secured by other means, such as nuts. The tie rod is held in position in the fuel cell stack by an interaction between the fuel cell assemblies, which are under compression, and engagement surfaces provided on the unitary tie rod near its extremities. The unitary tie rod may be considered as self-securing.

In the following description, corresponding reference numbers are used for corresponding features in FIGS. 2 to 5. Features that are common to more than one figure will not necessarily be described in relation to each figure.

Figure 1A:
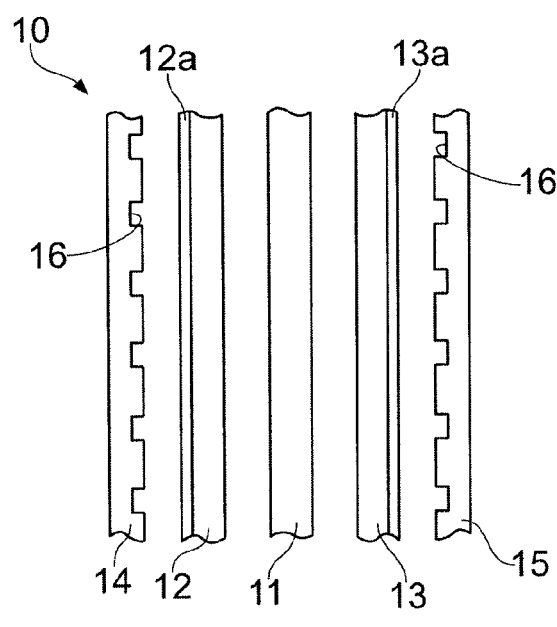
FIG. 1a illustrate a conventional fuel cell assembly.
Figure 1B:
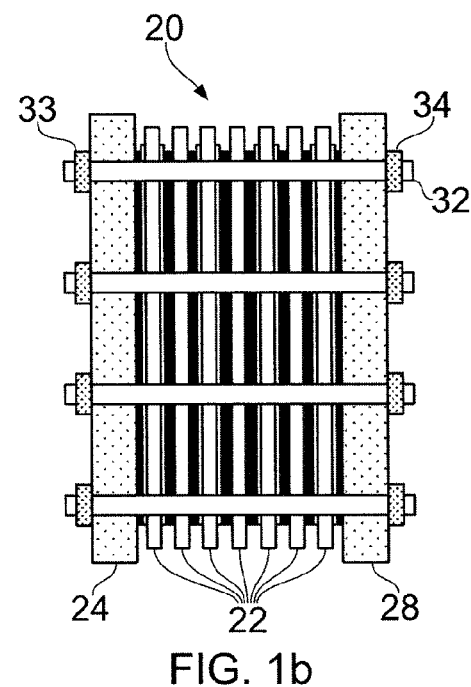
FIG. 1b illustrates a conventional fuel cell stack assembly.
Figure 2A:
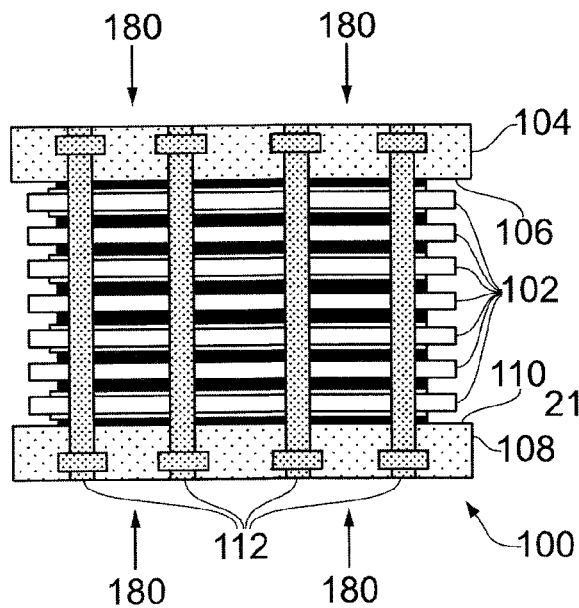
FIG. 2a illustrates a fuel cell stack assembly in accordance with an embodiment of the present invention.

FIG. 2a illustrates a fuel cell stack assembly 100 comprising a plurality of fuel cell assemblies 102, a first end plate 104, a second end plate 108 and a plurality of tie rods 112.

The fuel cell assemblies 102 are provided adjacent to one another in the form of a stack. The first end plate 104 is positioned at a first end of the plurality of fuel cell assemblies 102 such that an internal surface 106 of the first end plate 104 is adjacent to the fuel cell assemblies 102. The second end plate 108 is positioned at an opposing second end 110 of the plurality of fuel cell assemblies 102 such that an internal surface 110 of the second end plate 108 is adjacent to the fuel cell assemblies 102.

The plurality of fuel cell assemblies 102 of a fuel cell stack are compressed in a direction normal to the plane of the fuel cell assemblies 102 prior to the insertion of tie rod 112 by an external force. The external force is shown schematically with reference numbers 180 in FIG. 2a. The external force 180 applies pressure between the first and second end plates 104, 108. The tie rod 112 is configured to engage the first and second end plates 104, 108 when the external force is removed. The plurality of fuel cell assemblies 102 can be considered to cause a force to be applied to engagement surfaces of the tie rod 112 to hold it in place as described in more detail below.

Figure 2B:
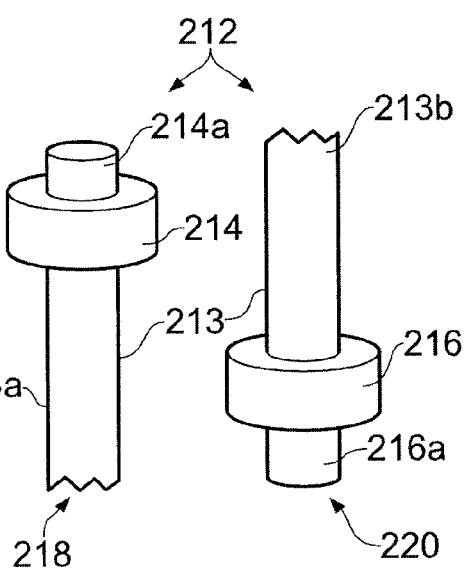
FIG. 2b illustrates views of a tie rod in accordance with the present invention.

Features of a tie rod 212 may be seen more clearly in FIG. 2b. The tie rod 212 comprises an extending portion 213, a first engagement portion 214 and a second engagement portion 216. The extending portion 213 extends in an axial direction. The first and second engagement portions 214, 216 are provided at or near opposite extremities along an axial length of the extending portion 213 of the tie rod 212. The engagement portions 214, 216 are wider than the extending portion 213 in a dimension perpendicular to the axis. In this example, the extending portion 213 and the first and second engagement portions 214, 216 are all cylinders with a circular cross section, although this need not be the case. Indeed, one or more of the extending portion 213 and the first and second engagement portions 214, 216 need not be cylindrical at all. In some embodiments, the extending portion 213 and the first and second engagement portions 214, 216 may each have any shaped cross section.

The tie rod 212 is a unitary component. Such a unitary component may not require any separate securing means, such as nuts, to hold it in place. A unitary component can be provided as a monolithic piece of material. Casting, injection moulding or machining may be suitable methods for manufacturing such a unitary component. It will be appreciated that a wide variety of manufacturing techniques may be employed to form the unitary tie rod.

In this example, the extending portion 213 of the tie rod 212 comprises an inner section 213a, 213b and outer sections 214a, 216a. The outer sections 214a, 216a are separated from the inner section 213a, 213b by respective engagement portions 214, 216. The outer sections 214a, 216a can be used to grip or hold the tie rod 212 when it is being located in the fuel cell stack assembly 100.

The inner section 213a, 213b is shown with a discontinuity in FIG. 2b for illustrative purposes only. The inner section 213a, 213b comprises a first portion 213a and a second portion 213b disposed at opposite extremities of the inner section 213a, 213b of the extending portion 213 in an axial direction.

FIG. 3 illustrates a first end plate 304, a second end plate 308 and a tie rod 312. Provided below is a description of how the tie rod 312 engages with the first and second end plates 304, 308.

The extending portion of the tie rod 312 has a first portion 313a that is adjacent to and inside the first engagement portion 314. The first portion 313a of the extending portion engages with a recess 340a in the first end plate 304. The first engagement portion 314 has a first engagement surface 315 that engages with an outer surface 307 of the first end plate 304 when the fuel cell stack assembly is assembled and not under external compression.

Similarly, the extending portion of the tie rod 312 has a second portion 313b that is adjacent to and inside the second engagement portion 316. The second portion 313b of the extending portion engages with a recess 340b in the second end plate 308. The second engagement portion 316 has a second engagement surface 317 that engages with an outer surface 311 of the second end plate 308 when the fuel cell stack assembly is assembled and not under external compression.

The recesses 340a, 340b in the first and second end plates 304, 308 may be referred to as side recesses.

The tie rod 312 can be retained in position within a fuel cell assembly by a force exerted on the first and second engagement portions 314, 316 of the tie rod by the respective end plates 304, 308 in an axis of the tie rod 312. The force results from the resilient expansion of the plurality of fuel cell assemblies from their compressed state formed by the external pressure during assembly of the stack.

FIG. 4 shows an alternative embodiment of a portion of an end plate 404. The end plate 404 has an inner surface 406 and an outer surface 407. The inner surface 406 is closer to the fuel cell assemblies than the outer surface 407 when the fuel cell stack is assembled. The end plate 404 also has a side surface 442 that connects the inner surface 406 and the outer surface 407.

It will be appreciated that the second end plate can have substantially the same structure as the first end plate and that the end plate 404 shown in FIG. 4a may represent either the first or second end plate.

The end plate 404 comprises a side recess 440a that is situated in the side surface 442. The side recess 440a extends in a depth direction normal to the side surface 442. In the example shown in FIG. 4, the side recess extends throughout the end plate 404, from the inner surface 406 to the outer surface 407. Alternatively, the thickness of the side recess can extend from the inner surface 406 and terminate within the end plate 404. The side recess 440a is configured to accommodate the first or second portion of the extending portion of a tie rod. That is, the extending portion of the tie rod may be received within the side recess 440a during assembly of a fuel cell stack.

It will be appreciated that a side recess may also be provided in each of the fuel cell assemblies that are provided between the first and second end plates. The side recess in each of the fuel cell assemblies may be of a similar geometry to the side recess provided in the first and second end plates. In particular, all of the side recesses may have a common cross section so as to allow a tie rod to be inserted into them. The common cross section may have a greater width than, or equal width to, the extending portion of the tie rod.

The end plate 404 of FIG. 4 also comprises an engagement recess 444. The engagement recess 444 is situated on the outer surface 407 of the end plate 404. The engagement recess 444 extends in a depth direction normal to the outer surface 407. A floor of the engagement recess 444 provides an engagement surface 446 for the tie rod. The engagement surface 446 is parallel with both the outer surface 407 and the inner surface 406 in this example, although it will be appreciated that this may not always be the case.

FIG. 5 shows another alternative embodiment of a portion of an end plate 504. FIG. 5a shows a top view of the end plate 504. FIG. 5b shows a perspective view of the end plate 504 similar to the view of FIG. 4.

The end plate 504 comprises an elongated side recess 540 that has a depth that is larger than the diameter of a tie rod. The side recess 540 is a void that has an entry portion 548 and an engaging portion 550. The extending portion of the tie rod can be inserted through the entry portion 548 and placed in contact with the end plate when in position at the engaging portion 550. At the engaging portion 550, the engagement surface 546 of the end plate 504 can be brought into contact with an engaging surface of the tie rod by releasing an over-compression on the fuel cell stack assembly. An over-compression is a force applied to the fuel cell stack to compress it to a thickness that is less than its intended working dimension.

In some examples the engagement recess 544 may have a retaining member to prevent the tie rod from moving away from the engaging portion 550 in use, thereby preventing the tie rod from disengaging from the end plate 504. Such a retaining member may be a wall or raised section on the engagement surface 546 of the end plate, over which the engagement portion of a tie rod must be passed to locate it in the engaging portion 550 of the side recess 540. Once the fuel cell stack has been allowed to expand to a working dimension, the retaining member may provide a barrier to the tie rod moving from the engaging portion towards the entry portion 548 of the side recess 540.

Figure 6:
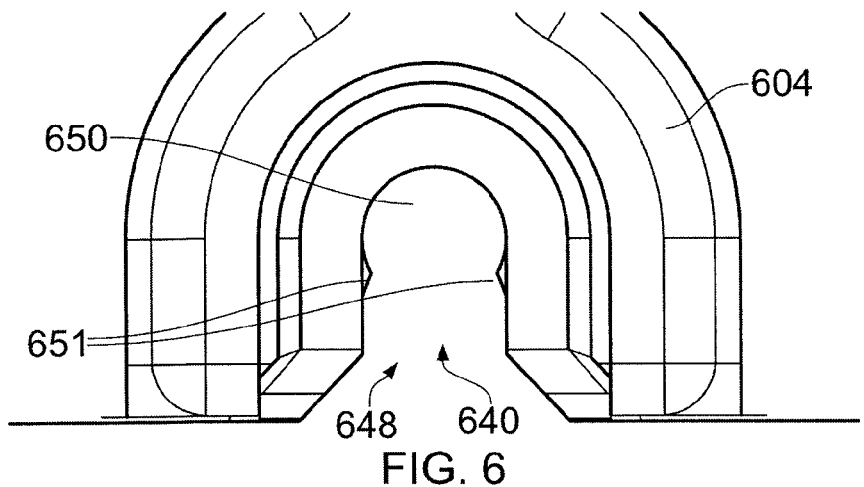
FIG. 6 shows a schematic of a top view of a portion of an end plate for use with an embodiment of the invention.

FIG. 6 shows a top view of alternative embodiment of a portion of an end plate 604. The end plate 604 comprises an elongated side recess 640. As with the embodiment of FIG. 5*a*, the side recess 640 is a void that has an entry portion 648 and an engaging portion 650. In this example the side recess 640 has a retaining member to prevent the tie rod from moving away from the engaging portion 650 in use, thereby preventing the tie rod from disengaging from the end plate 604. The retaining member in this embodiment is a clip 651 that is resiliently deformable in order to allow the tie rod to pass the retaining member into the engaging portion 650 of the side recess 640. The resiliency of the clip 651 provides a barrier to the tie rod moving from the engaging portion towards the entry portion 648 of the side recess 640.

Figure 7:
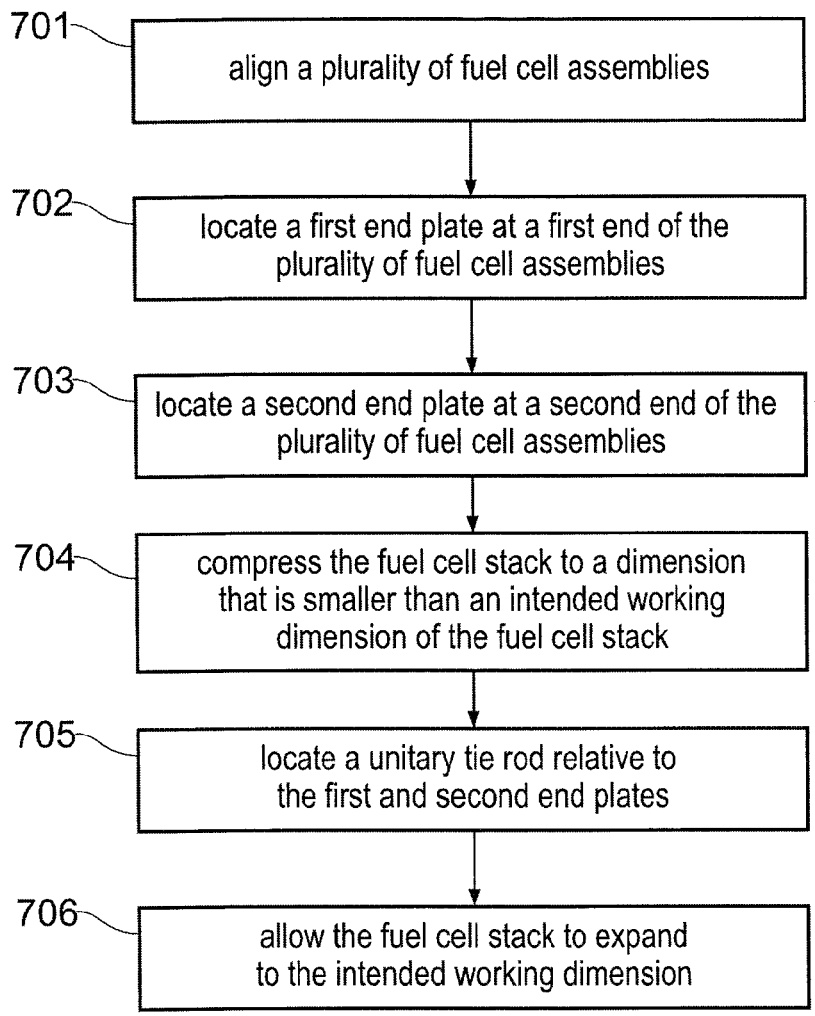
FIG. 7 illustrates a method of assembling the fuel cell stack in accordance with an embodiment of the invention.

FIG. 7 illustrates a method of assembling a fuel cell stack assembly.

The method commences with the alignment of a plurality of fuel cell assemblies at step 701. Subsequently, a first end plate is located at a first end of the plurality of fuel cell assemblies at step 702. Alternatively, the plurality of fuel cell assemblies may be stacked sequentially on the first end plate. A second end plate is then located at a second end of the plurality of fuel cell assemblies at step 703. The first end plate, the plurality of fuel cell assemblies and second end plate may be considered to provide a fuel cell stack.

The method proceeds by compressing the fuel cell stack to a dimension that is smaller than an intended working dimension of the fuel cell stack at step 704. This may be referred to as over-compression A unitary tie rod is then located such that a first engagement surface of the tie rod is in the vicinity of the first end plate and a second engagement surface of the tie rod is in the vicinity of the second end plate at step 705. This locating step 705 can be achieved by inserting an extending portion of the tie rod into side recesses of the first and second end plates. The fuel cell stack is then allowed to expand to the intended working dimension at step 706. After this step has been performed, the first engagement surface of the tie rod engages with the first end plate and the second engagement surface of the tie rod engages with the second end plate thereby impeding further expansion of the fuel cell stack beyond the intended working dimension.

The invention claimed is:

1. A fuel cell stack assembly comprising:
a plurality of fuel cell assemblies, each fuel cell assembly adjacent to at least one other fuel cell assembly;
a first end plate at a first end of the plurality of fuel cell assemblies;
a second end plate at a second opposing end of the plurality of fuel cell assemblies; and
a tie rod configured to engage the first and second end plates and thereby apply a compression force to the plurality of fuel cell assemblies,
wherein the tie rod is a unitary component that comprises a first engagement portion, a second engagement portion and an extending portion disposed partially between the first engagement portion and the second engagement portion and extending in an axial direction,
wherein the first engagement portion and the second engagement portion are wider than the extending portion in a dimension perpendicular to the axial direction,
wherein the extending portion comprises an inner section disposed between the first engagement portion and the second engagement portion and comprises a first outer section and a second outer section,
wherein the first engagement portion separates the inner section and the first outer section and the second engagement portion separates the inner section and the second outer section,
wherein a first engagement surface that engages with the first end plate is provided on the first engagement portion and a second engagement surface that engages with the second end plate is provided on the second engagement portion.

2. The fuel cell stack assembly of claim 1, wherein the first engagement surface and the second engagement surface are transverse to an axial length of the tie rod.

3. The fuel cell stack assembly of claim 1 wherein the first and second end plates are configured to retain the tie rod in position by a force exerted on the first engagement surface and the second engagement surface of the tie rod along an axis of the tie rod, the force resultant from the constrained expansion of the plurality of fuel cell assemblies from a compressed state.

4. The fuel cell stack assembly of claim 1, wherein the first end plate comprises an engagement recess, the engagement recess of the first end plate configured to engage the first engagement surface of the tie rod, and the second end plate comprises an engagement recess, the engagement recess of the second end plate configured to engage the second engagement surface of the tie rod.

5. The fuel cell stack assembly of claim 4, wherein an outer surface of the first end plate comprises the engagement recess and an outer surface of the second end plate comprises the engagement recess.

6. The fuel cell stack assembly of claim 4, wherein the engagement recesses comprise a retaining member configured to prevent the tie rod from disengaging from the first and second end plates.

7. The fuel cell stack assembly of claim 1, wherein the extending portion is cylindrical.

8. The fuel cell stack assembly of claim 1, wherein the first engagement surface of the tie rod faces the second engagement surface of the tie rod.

9. The fuel cell stack assembly of claim 1, wherein a side of the first end plate comprises a side recess and a side of the second end plate comprises a side recess, wherein the side recesses are configured to receive the tie rod.

10. The fuel cell stack assembly of claim 9, wherein the side recesses extends throughout the thickness of the first end plate and the second end plate.

11. The fuel cell stack assembly of claim 9, wherein the side recesses of the first end plate and second end plate have a common cross section.

12. The fuel cell stack assembly of claim 11, wherein the common cross section of the side recesses is larger than or equal to a cross section of the tie rod.

13. The fuel cell stack assembly of claim 9, wherein the side recesses comprise a retaining member configured to prevent the tie rod from disengaging from the first and second end plates.

* * * * *